(12) United States Patent
Trenshaw

(10) Patent No.: US 12,103,705 B2
(45) Date of Patent: Oct. 1, 2024

(54) AERIAL DRONE WITH ROTATING FRAME

(71) Applicant: Lucas Trenshaw, Superior, CO (US)

(72) Inventor: Lucas Trenshaw, Superior, CO (US)

( * ) Notice: Subject to any disclaimer, the term of this patent is extended or adjusted under 35 U.S.C. 154(b) by 0 days.

(21) Appl. No.: 17/983,989

(22) Filed: Nov. 9, 2022

(65) Prior Publication Data
US 2024/0150018 A1     May 9, 2024

(51) Int. Cl.
*B64D 7/02*     (2006.01)
*A62C 3/02*     (2006.01)
*B64U 101/30*   (2023.01)
*B64U 101/60*   (2023.01)

(52) U.S. Cl.
CPC .............. *B64D 7/02* (2013.01); *A62C 3/0228* (2013.01); *B64U 2101/30* (2023.01); *B64U 2101/60* (2023.01)

(58) Field of Classification Search
CPC ............ B64U 2101/30; B64U 2101/64; B64U 2101/47; B64U 2101/45; B64U 2101/18; A62C 3/0228; B64D 7/02; B64C 39/024
See application file for complete search history.

(56) References Cited

U.S. PATENT DOCUMENTS

| | | | |
|---|---|---|---|
| 8,205,822 B1 | 6/2012 | Jameson et al. | |
| 9,079,662 B1 | 7/2015 | Duffy et al. | |
| 10,315,528 B1* | 6/2019 | Crawford, Jr. | .......... B60L 53/80 |
| 10,982,924 B1* | 4/2021 | Al Hazmi | ................ F41A 9/34 |
| 11,137,756 B2 | 10/2021 | Sterling et al. | |
| 11,447,246 B2 | 9/2022 | Kunz et al. | |
| 2014/0297067 A1* | 10/2014 | Malay | .................. G05D 1/0094 |
| | | | 701/4 |
| 2016/0016674 A1* | 1/2016 | Zhao | ..................... G03B 15/006 |
| | | | 244/118.1 |
| 2016/0159472 A1* | 6/2016 | Chan | ....................... B64C 27/54 |
| | | | 244/39 |
| 2017/0075351 A1* | 3/2017 | Liu | ......................... B64U 10/14 |
| 2018/0162527 A1* | 6/2018 | Hupp | ................... G05D 1/0038 |
| 2019/0041872 A1* | 2/2019 | Lang | ..................... B64C 39/024 |
| 2019/0373173 A1* | 12/2019 | Wang | ..................... B64U 20/87 |
| 2020/0317318 A1* | 10/2020 | Wu | ........................ B64U 20/77 |

OTHER PUBLICATIONS

Amazon.com listing of GoPro protective housing (Year: 2020).*
Press release from UAS Drone, Aug. 15, 2022, "UAS Drone's Subsidiary, Duke Robotics, to introduce the IC Drone, a revolutionary, safer, and cost-efficient drone technology for conducting routine maintenance of critical infrastructure", pp. 1-8.
Hicks et. al., Army Research Laboratory, Apr. 2009, "AH-64D Apache Longbow/Video from UAS for Interoperability Teaming Level II (VUIT-2) Aircrew Workload Assesment", pp. ii-72.
Open-Source flight controller software for modern flight boards, Cleanflight.com, 2014-2017, http://cleanflight.com.
BetaFlight.com, 2022, https://betaflight.com.
ArduPilot.org, 2022, https://ardupilot.org.
LibrePilot.org, 2016, https://librepilot.org.

* cited by examiner

*Primary Examiner* — Michael C Zarroli
*Assistant Examiner* — Peter A Taraschi

(57) ABSTRACT

An aerial drone is provided with a central passage and a rotating frame. A payload moves within the central passage through the drone body into a deployed position. The payload engages with the rotating frame and can be rotated into a desired orientation below the drone.

19 Claims, 11 Drawing Sheets

AERIAL DRONE WITH ROTATING FRAME

BACKGROUND

Aerial drones are useful for carrying various types of payloads such as package delivery, cameras for surveillance, and both civilian and military uses. These drones use spinning rotors to hover and traverse through the air and can be piloted remotely by a user. The remainder of this disclosure is directed at drone platforms and systems and methods for configuring and operating such a drone.

SUMMARY

The present disclosure relates to an aerial drone with a central passage and a rotating frame, as shown and/or described herein, and as set forth in the claims.

In an embodiment, an aerial drone includes a drone body and a rotating frame coupled to the drone body and rotatable with respect to the drone body around a first axis. The drone also includes a central passage passing through the drone body and through the rotating frame along the first axis. The central passage extends between a top opening in the drone body and a bottom opening in the rotating frame. A payload is translatable within the central passage between a stowed position in which the payload emerges above the top opening and a deployed position in which the payload emerges below the bottom opening. In the deployed position, the payload is rotatable by the rotating frame. In an embodiment, the rotating frame includes a swivel rotatable through at least 360 degrees about the first axis.

In an embodiment, an aerial drone includes a drone body with a flight camera and a plurality of flight surfaces (such as rotors). The drone also includes a swivel coupled to the drone body and rotatable with respect to the drone body around a first vertical axis. A central passage passes through the drone body and through the swivel along the first vertical axis. The central passage extends between a top opening in the drone body and a bottom opening in the swivel. A chassis is supported by the swivel and positioned below the bottom opening. The chassis is rotatable with respect to the swivel around a second horizontal axis. A payload is translatable within the central passage between a stowed position in which the payload emerges above the top opening and a deployed position in which the payload emerges below the bottom opening. The drone body also includes a controller programmed to execute a descent mode in which the chassis is rotated to align the payload with the central passage. In an embodiment, the controller is further programmed to execute a flight mode. In the flight mode, the payload is operable within a hemispherical space defined by rotation of the swivel through at least 360 degrees and rotation of the chassis through at least 140 degrees.

BRIEF DESCRIPTION OF THE DRAWINGS

The embodiments presented in this disclosure are described in detail below with reference to the following figures.

DETAILED DESCRIPTION

The present disclosure relates to an aerial drone with a rotating frame that can carry a variety of payloads. In an embodiment, the drone has a rotating frame design that enables a payload to rotate below the drone. The frame rotates within 360 degrees in a first horizontal plane, and 180 degrees in a second vertical plane. These two planes of rotation enable the payload to be oriented within a hemisphere below the drone, so that the payload can be aimed or pointed in the desired direction. The drone body is built around a platform with a donut-shaped design, in which the payload translates up and down through a central passage formed through the drone body. This design enables the payload to move up through the central passage for landing, stowing, removing, or replacing the payload, and to move down through the central passage into the hemisphere below the drone for deployment during use. The donut design with an open central passage offers many benefits for use of the payload, as will be described in further detail below.

Figure 1:
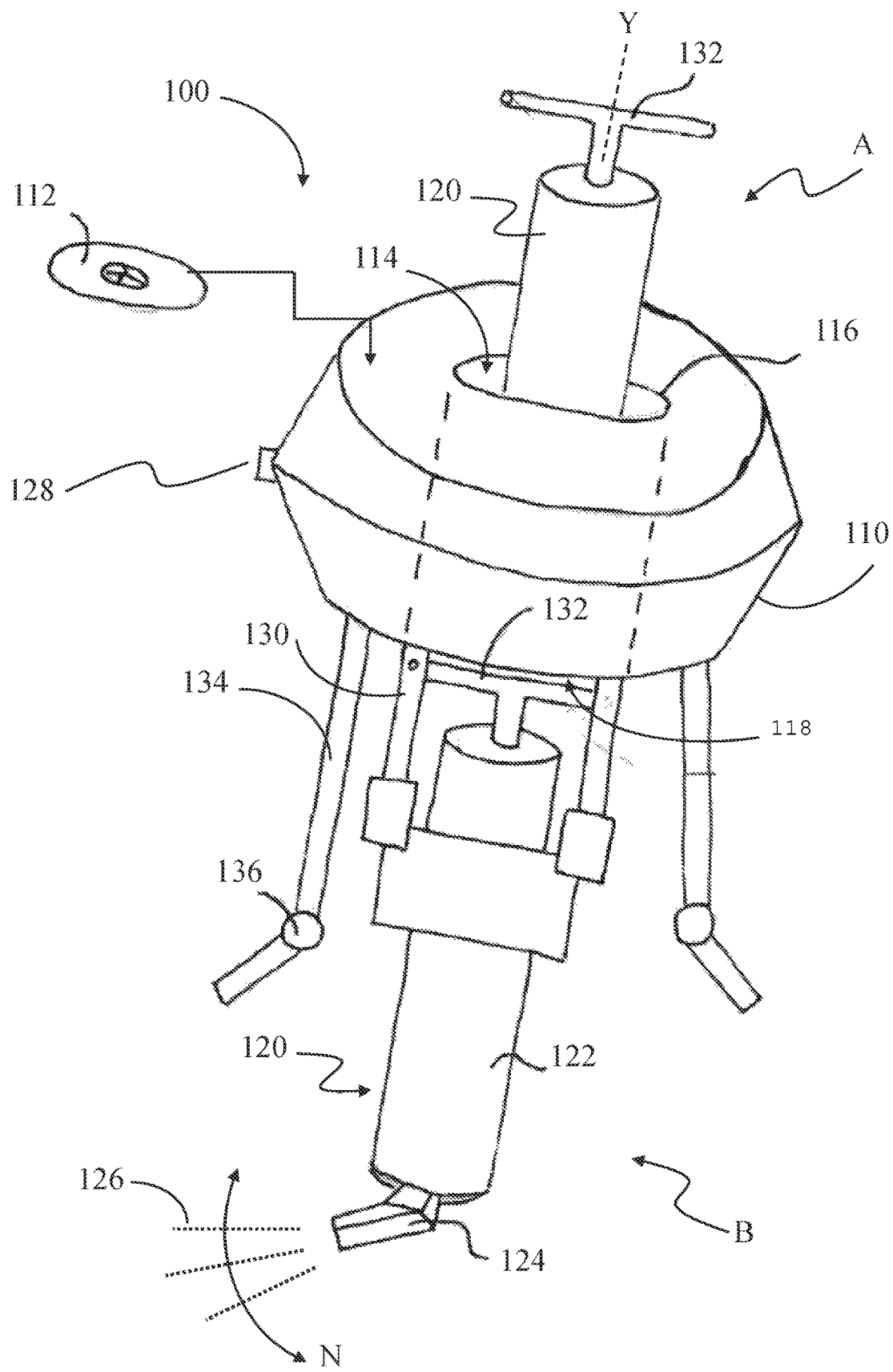
FIG. 1 is a perspective view of an aerial drone with a fire retardant payload, according to an embodiment of the present disclosure.

An aerial drone 100 according to an embodiment of the invention is shown in FIG. 1. In this embodiment, the aerial drone 100 includes a drone body 110 with a plurality of rotors 112 that lift the drone in flight. Only one rotor 112 is shown in FIG. 1, for clarity of the drawing, but the set of rotors 112 may include four, six, eight, or ten rotors, as examples, or other types of flight surfaces. The drone body 110 also includes a central passage 114 that forms an open channel through the drone body, from a top opening 116 to a bottom opening 118. A payload 120 translates up and down through the passage 114 between an upper stowed position (indicated by letter A) and a lower deployed position (indicated by letter B). In the upper position A, the payload is disabled and not in use, such as when the drone has landed. In the lower position B, the payload is enabled for use during the drone's flight.

In the embodiment of FIG. 1, the payload 120 includes a canister 122 with a nozzle 124. The canister 122 is filled with a substance 126 that the drone delivers at the desired destination, such as water or a fire retardant. When the drone 100 is in position, the payload can be operated to release the fire retardant 126 (or other substance) through the nozzle 124. As an example, the drone 100 can be deployed to fight fires in an urban or rural setting, by flying the drone to the site of the fire and activating the payload to release the fire retardant toward the flames. The drone 100 also includes a flight camera 128 on the drone body 110 that can be used to navigate and orient the drone.

To orient the payload 120 in the desired direction, the drone 100 includes a rotating frame, such as a swivel 130. The swivel 130 is mounted at the bottom of the drone body 110, and is rotatable with respect to the drone body 110 about a vertical axis Y. (This axis is described as "vertical" in the frame of reference of the drone body 110, but it should be understood that in use, the drone may tilt such that the axis Y is not vertical with the ground.) The central passage 114 passes through the swivel 130, so that in the deployed position B the payload 120 emerges below the swivel. In an embodiment, the bottom opening 118 passes through the swivel 130. During flight, the swivel 130 can rotate within 360 degrees about axis Y to orient the payload 120 in a desired direction. In an embodiment, the central passage 114 is centered around the same axis Y.

The payload 120 has a mating interface with the swivel 130 to secure the payload 120 to the swivel in the deployed position B. In an embodiment, the mating interface includes a crossbar 132 that is received into the swivel 130 in position B. When the swivel 130 rotates about axis Y, the swivel acts on the crossbar 132 and the payload 120 rotates with the swivel. In an embodiment, the nozzle 124 can also rotate (independently of the swivel) in a vertical plane, as indicated by the arrows N. By rotating the swivel 130 about axis Y, and rotating the nozzle through arrows N, the payload can be aimed within a large three-dimensional space below the drone body 110. Further examples of rotation are described below.

In an embodiment, the drone body has a circular shape with a diameter of about 2-2.5 feet, and the central passage has a diameter of about 8-12 inches.

Still referring to FIG. 1, the drone body 110 includes articulating legs 134. Two legs 134 are shown in the figure for clarity, but the drone may have four, six, eight, or other suitable number of legs. The legs 134 include joints 136 for bending the legs during flight, to move the legs up out of reach of the payload 120. In the deployed position B, the payload 120 extends below the legs 134.

When the drone 100 lands, the payload 120 moves into the stowed position A. The payload 120 can then be entirely removed from the drone by lifting it up out of the central passage 114. The canister 122 can be refilled for another use, or a different type of payload can be inserted into the drone 100 for its next flight. The donut design of the drone 100 provides a modular system in which the same drone 100 can carry various different types of payloads 120. Other examples of payloads are shown and described below.

Figure 2:
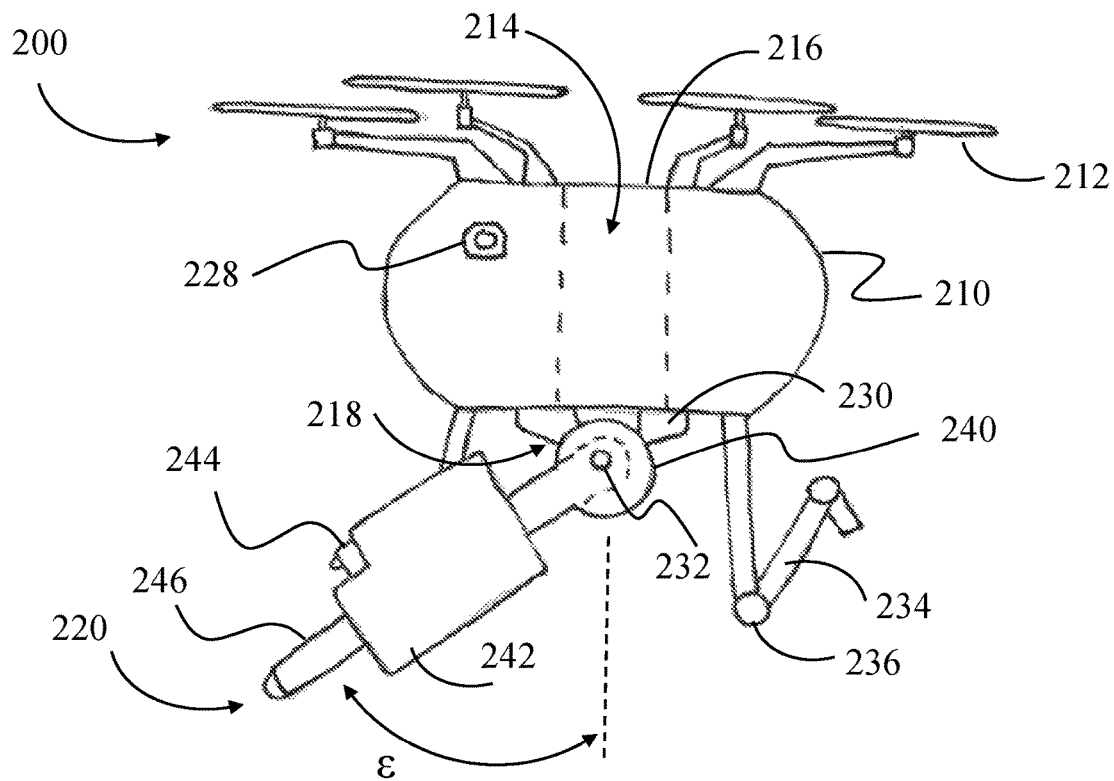
FIG. 2 is a side view of an aerial drone with a dispensing payload, according to an embodiment of the present disclosure.

An embodiment of an aerial drone 200 with a dispensing payload is shown in FIG. 2. Similar to drone 100, the drone 200 includes a drone body 210, a plurality of rotors 212, a central passage 214, and a payload 220. In this embodiment, the rotating frame includes two rotating components that rotate about different axes—a swivel 230 and a chassis 240 coupled to the swivel. The swivel 230 is located at the bottom of the drone body 210 and rotates through 360 degrees about a vertical axis. The passage 214 creates an open chute that extends from a top opening 216 in the drone body 210 through a bottom opening 218 in the swivel 230. The drone 200 also includes legs 234 with joints 236. The drone body 210 also includes one or more flight cameras 228 that can be used by the drone operator to navigate the drone to a desired destination. The flight cameras can include various types of imaging such as thermal imaging (infrared), visible imaging, and other visual sensing.

The chassis 240 rotates within a vertical plane about a horizontal axis. The chassis 240 is rotatably coupled to the swivel 230, such that swivel 230 spins the chassis 240 in the horizontal azimuth plane, and then the chassis 240 lifts and lowers the payload 220 in a vertical elevation plane. Together, the chassis and swivel form a multi-axis rotating frame that can orient the payload in a desired direction below the drone body.

In the embodiment of FIG. 2, the payload 220 is secured to the chassis 240 at a mating interface, such as the receipt of a T-handle or crossbar 232 into a mating slot or mechanical lock within the chassis 240. (Example of mating interfaces will be discussed in more detail in FIGS. 4A-4B.) When the payload 220 is loaded into the drone 200, the payload 220 drops down through the central passage 214 into a deployed position in which the payload mates with the chassis 240. In this deployed position, the payload 220 is securely mounted to the chassis 240 and rotates with it. As shown in FIG. 2, the chassis 240 has rotated the payload through an angle c to point the payload in a desired direction.

In this embodiment, when the payload 220 is in the deployed position, it also passes through a separate payload housing 242. The payload housing 242 is an extension of the chassis 240 and is secured to the chassis 240 to rotate together with the chassis through the angle E. The payload housing 242 does not move up and down through the central passage 214, but rather remains below the drone body 210, with the chassis 240. The purpose of the payload housing 242 is to carry additional equipment that interfaces with the payload 220 during operation. For example, in FIG. 2, the payload housing 242 includes a payload camera 244. The payload housing 242 can also include its own power supply or fuel source (such as an on-board battery, solar panels, or other fuel), sensors (such as orientation sensors, environmental sensors, accelerometers, and other suitable sensors), cameras (infrared, visual, wide-angle, or other specialty cameras or lenses), shock absorbers, links and couplings between the payload and the chassis, and other suitable components for operation of the drone or the payload.

The payload housing 242 can carry components that are reused when the payload is removed and replaced. For example, when a payload is emptied or needs to be removed and replaced from the drone, the payload camera 244 can continued to be used with the next payload. The payload camera 244 is therefore located on the payload housing 242 which remains in place below the drone body and is reused with each payload. When the drone lands, the articulating legs extend below the payload housing 242 to support it above the ground.

The payload 220 shown in FIG. 2 includes a canister, nozzle, or dispenser 246 that moves with the payload 220 through the passage 214 and into the deployed position below the drone body 210. The dispenser 246 releases materials carried within the payload 220, such as seeds for agricultural uses, food pouches for humanitarian needs, or other materials the drone is sent to deliver.

Figure 3:
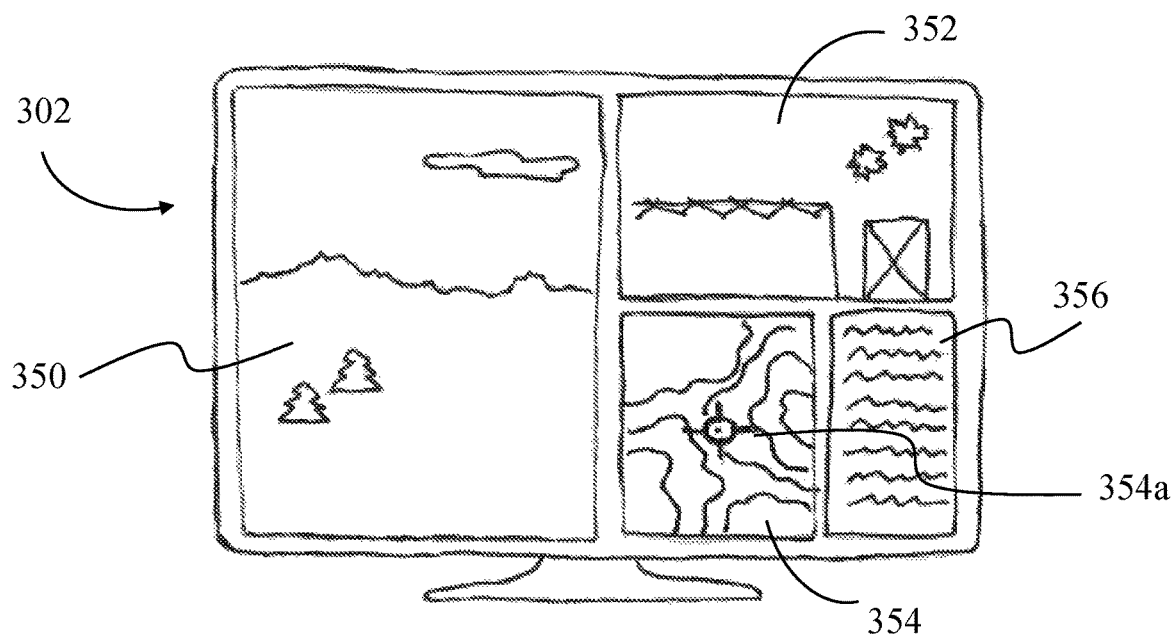
FIG. 3 is a front view of a user interface for operating an aerial drone, according to an embodiment of the present disclosure.

FIG. 3 shows a user interface 302 used by an operator to navigate and operate the drone (such as drone 100 or 200 or other drones shown herein), according to an embodiment. The user interface is displayed on a display screen such as a computer monitor or other display. The user interface 302 includes a first window 350 which shows a real-time view from a first camera of the drone (such as the flight camera 128, 228), and a second window 352 which shows a real-time view from a second camera (such as the payload camera 244). The flight view 350 shows the environment where the drone is flying and can be used to navigate the drone to its destination. The payload view 352 shows the view from the direction of the payload, which in FIG. 3 is looking down at the ground below the drone. The user interface 302 also includes a map window 354 showing a current position 354a of the drone on a map, and a data window 356 showing additional data about the drone. The data window 356 shows information such as equipment status, battery life, flight time, sensor measurements, remaining fuel capacity, remaining payload capacity, allocated range, altitude, distance to intended target, wind direction and speed, warnings, and failures.

The user interface 302 allows for user input on flight direction manually using keyboard and mouse control and macro commands. In an embodiment, the user interface includes a line tool, and the user draws a line over the map window 354 to a map location to automate flight to that location. The user can draw on the map 354 to make unique flight patterns, such as to lay seed on a field in rows or follow a perimeter around a patrol area. These navigational commands can be looped as well, to send the drone on a repeating path, such as for repeating patrol along a perimeter, watering over a repeating groundtrack, or other activities. The user can enter commands (navigation, imaging, deploying, and other commands) to the drone via the user interface 302, controlling the drone in real-time. Alternatively, some commands can be programmed by the user and executed autonomously by the drone.

The user interface 302 also enables the user to control the payload view 352, such as by zooming the camera, switching to thermal imaging, or other commands. The user can also enter commands to switch the drone into the landing mode, which puts the payload into a disabled or non-operational position (described in further detail below).

Figure 4A:
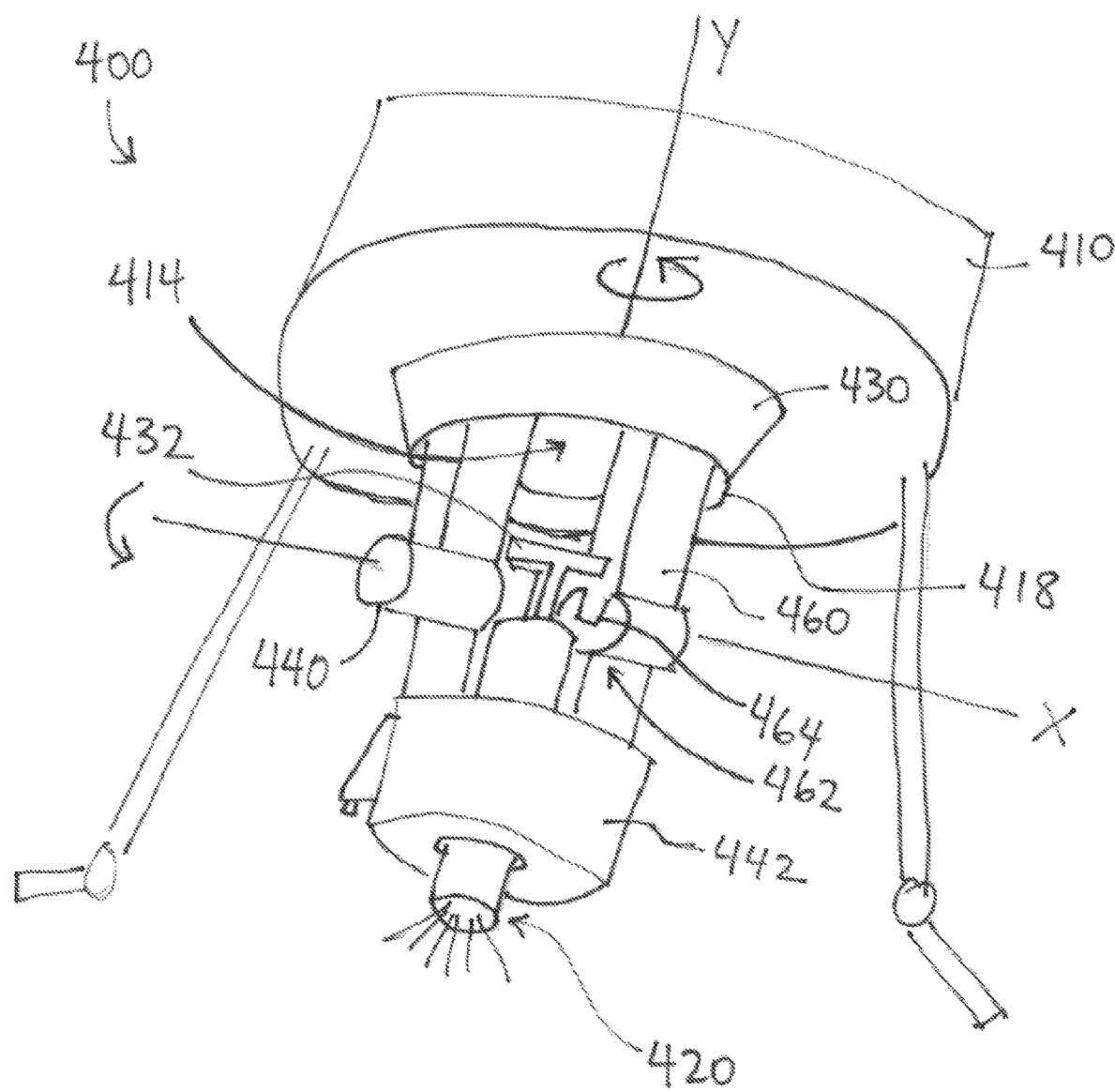
FIG. 4A is a lower perspective view of an aerial drone with a civilian payload, according to an embodiment of the present disclosure.

Turning to FIG. 4A, a lower perspective view of a drone 400 is shown to provide more detail about the rotating frame and mating interface with the payload. The drone 400 includes a drone body 410, payload 420, central passage 414, and swivel 430 with a bottom opening 418. The swivel 430 rotates around a first vertical axis Y. A chassis 440 is suspended below the swivel 430 and secured to the swivel by support columns 460. These columns 460 are just one example, and the chassis 440 can be secured to the swivel 430 through various types of mechanical connections. The chassis 440 rotates with respect to the swivel 430 about a second horizontal axis X. A sprocket 441 rotates the chassis about axis X. If a separate payload housing 442 is included, it is secured to the chassis 440 to rotate with the chassis 440.

FIG. 4A also shows an example of a mating interface 462 between the payload 420 and the drone 400. In this example, the mating interface 462 includes a mechanical fitting of the payload 420 with the rotating frame. The payload 420 includes a crossbar 432 that is received into a slot 464 in the chassis 440 when the payload 420 moves down through the passage 414 into the deployed position. The crossbar 432 mates with the slot 464 and is locked into place there, such as by electrical servo motors, switches, latches, or other suitable mechanism. This interface between the payload and the chassis at the mating interface 462 secures the payload 420 to the chassis 440 such that the payload will move with the chassis in rotation about axis X. Further, because the chassis 440 is secured to the swivel 430, the payload and chassis will also move with the swivel in rotation about axis Y.

Figure 4B:
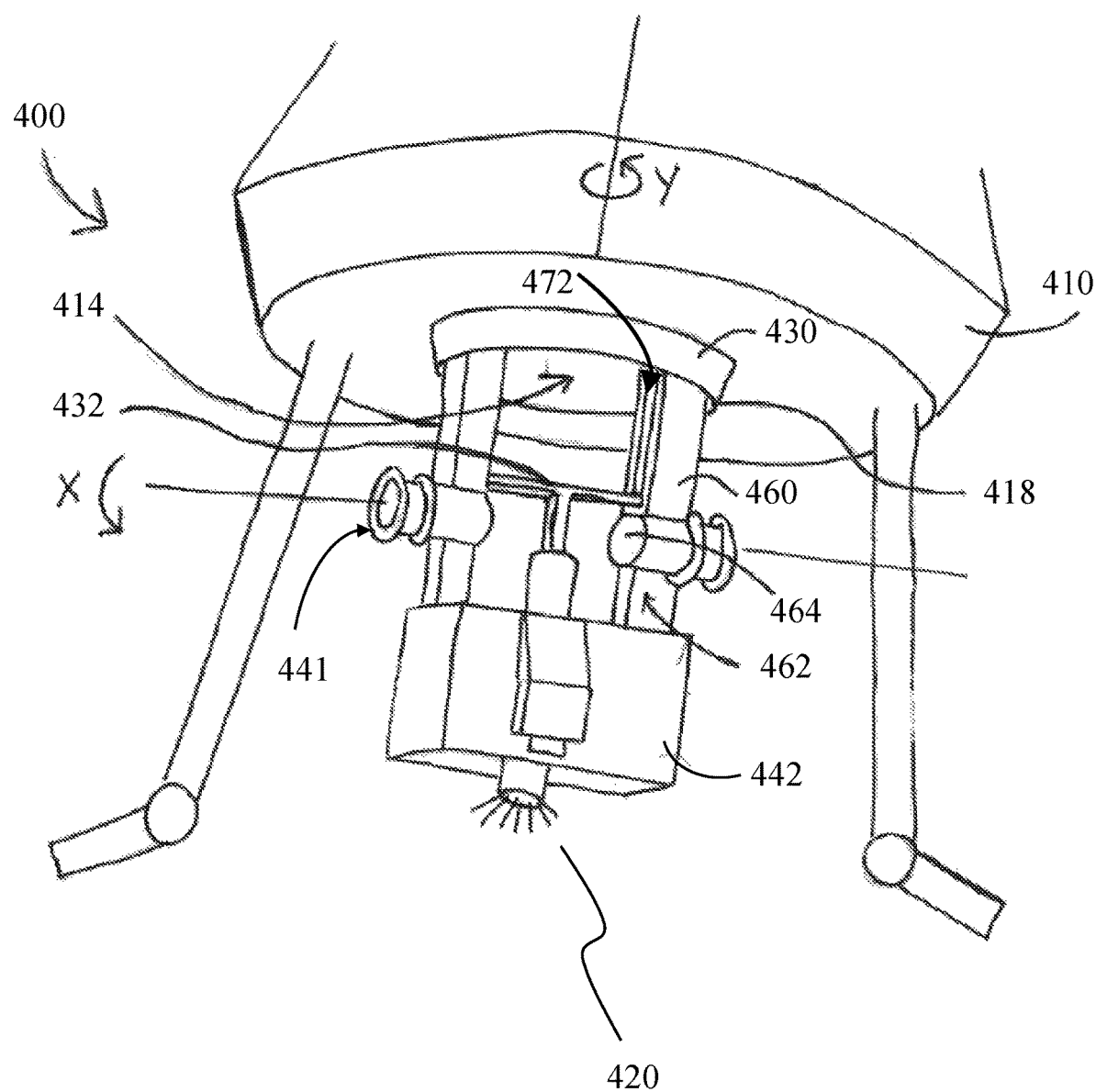
FIG. 4B is a lower perspective view of an aerial drone with a civilian payload, according to an embodiment of the present disclosure.

FIG. 4B shows another embodiment in which the crossbar 432 is offset from the chassis 440. Rather than nest all the way down in to a slot within the chassis, the crossbar 432 in FIG. 4B slides up and down within a track or groove 472 within support column 460, above the chassis 440. When the chassis rotates, the crossbar slides up and down within the groove 472. This design gives the payload a degree of freedom to rotate with the chassis into a desired orientation below the drone body. This degree of freedom also helps the drone to accommodate payloads of different lengths.

In addition to the crossbar and slot configuration shown in FIG. 4A and the offset groove shown in FIG. 4B, other types of mating interfaces can be used to couple the payload to the rotating frame. These can include ratcheting mechanisms, mechanical locks, clips, springs, axles, sprockets, and other options that retain the payload to the frame with enough degrees of freedom to rotate within the hemisphere below the drone body.

Figure 5:
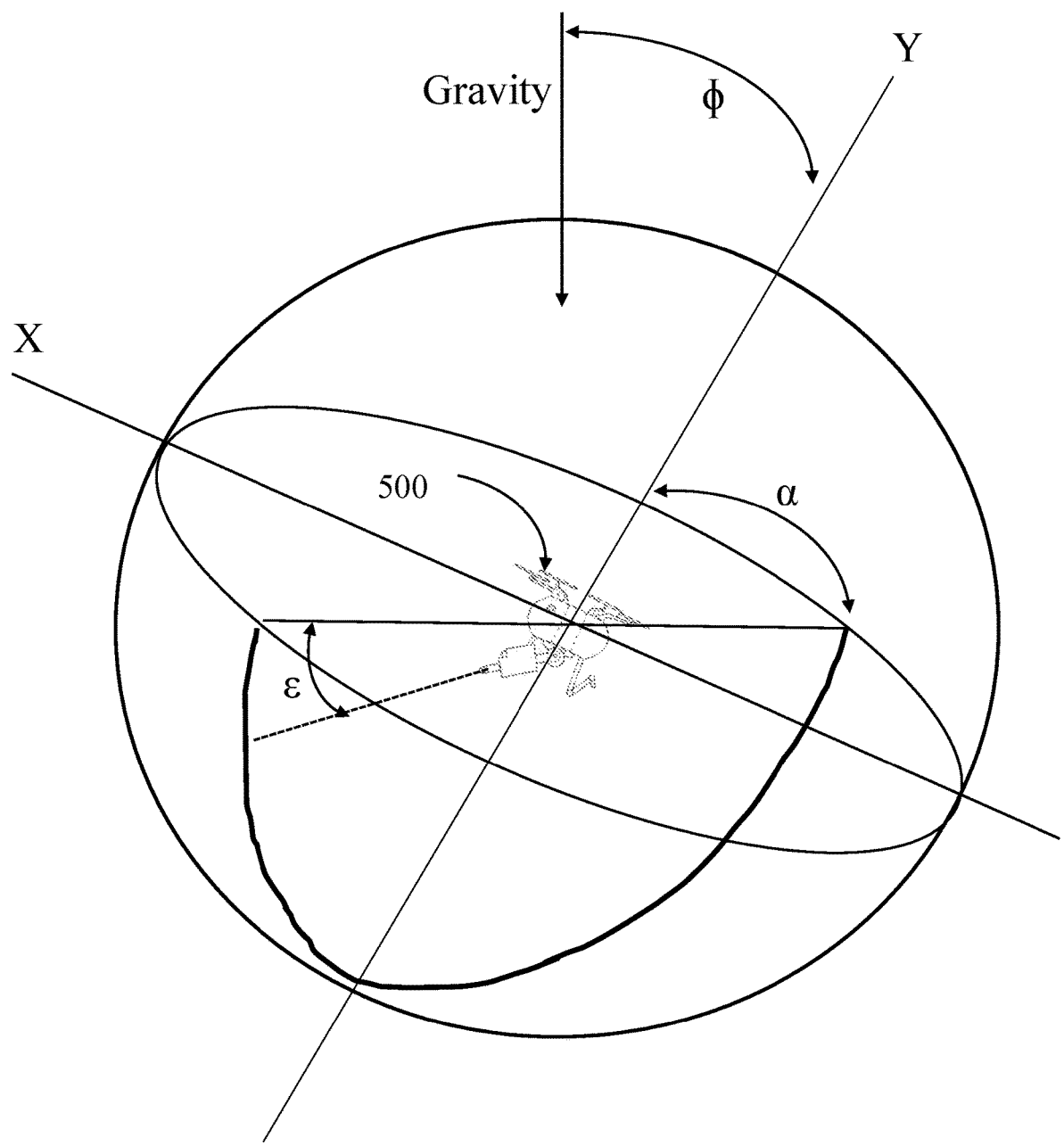
FIG. 5 is a schematic view of rotational axes of an aerial drone, according to an embodiment of the present disclosure.

The combination of rotations in two planes is shown in a schematic view in FIG. 5. The drone 500 includes a rotating platform that rotates the payload in two planes. A first rotating frame, such as the swivel, that rotates the payload in an azimuth plane about a first axis Y. The drone 500 also includes a second rotating frame, such as the chassis, that rotates the payload in an elevation plane about a second axis X. With these degrees of freedom, the drone 500 is able to hold its own position and attitude stationary while rotating the payload into a desired orientation within the hemisphere below the drone.

In FIG. 5, the drone 500 has rotated through angle $\Phi$ in the azimuth plane and through angle c in the elevation plane, which orients the payload in the direction of the dotted line. Additionally, the drone 500 is holding an orientation itself that is tilted from the direction of gravity by angle 4. This figure helps demonstrate that the axes Y and X are with respect to the drone, not gravity. Though these axes may be called "vertical" or "horizontal" herein, it should be understood that the drone and these axes may be tilted with respect to gravity.

Figure 6A:
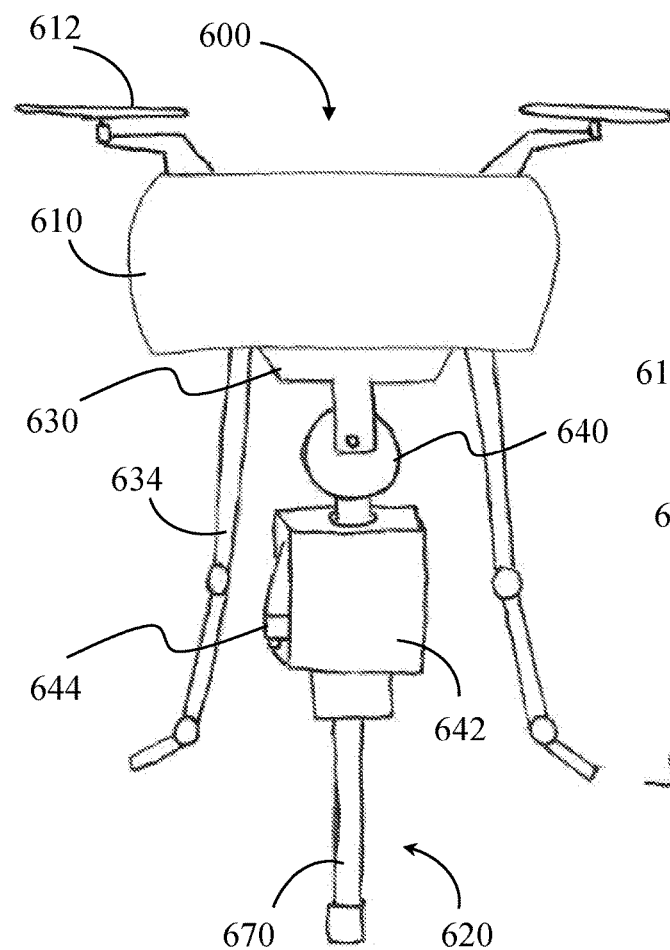
FIGS. 6A and 6B show an aerial drone in operational and landed states, respectively, according to an embodiment of the present disclosure.
Figure 6B:
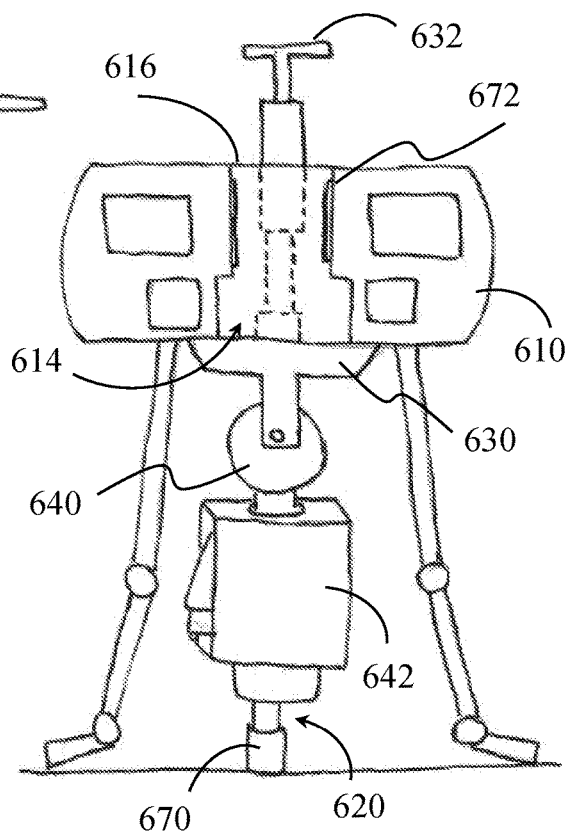

A further embodiment of an aerial drone 600 with a military payload is shown in FIGS. 6A-6B. The drone 600 includes a drone body 610, rotors 612, passage 614, rotating swivel 630, rotating chassis 640, payload 620, and payload housing 642. The payload 620 includes a weapon such as firearm 670. In FIG. 6A, the drone 600 is in an operational state with the payload 620 in the deployed position. In the deployed position, the payload 620 has moved down through the passage 614 and into the payload housing 642, and the payload rotates with both the chassis 640 and the swivel 630. The payload 620 extends through the payload housing 642 and below the legs 634. In FIG. 6B, the drone 600 is in a landed state with the payload 620 in the stowed, disabled position. The payload 620 is disengaged from the mating interface and from the chassis and swivel, and the payload translates up through the passage 614 so that the top of the payload emerges above the top opening 616 of the passage 614. When the drone 600 lands, the bottom of the payload 620 is even with the bottom of the legs 634.

In an embodiment, the passage 614 includes a vertical track 672 along an inside surface of the passage, and the track 672 guides the payload up and down within the passage 614 between the stowed position (FIG. 6B) and the deployed position (FIG. 6A). In an example, the crossbar 632 engages with and slides along the vertical track 672.

To prepare the drone 600 for use, the payload 620 is loaded into the drone through the top opening 616 as shown in FIG. 6B. The payload 620 passes through the passage 614 and all the way through the swivel 630, chassis 640, and payload housing 642, such that the tip of the firearm 670 rests on the ground. This is a safe position for the firearm as it can be serviced, replaced, or reloaded while aimed at the ground. The firearm also includes a safety mechanism (not shown) that should be activated while the drone is in the stowed position.

When the payload 620 is loaded into the drone 600, it can also be connected electrically and mechanically to components within the payload housing 642. In the military embodiment, where the payload includes a firearm 670, this step includes connecting the firearm to a switch or motor that operates the firearm trigger, a magazine that refills the firearm, and an electrical harness that operates the switch, motor, and/or any other sensors, cameras, or electrical components that operate with the firearm. These motors, switches, magazines, electrical cables, and other components are located within the payload housing 642 to interact with the payload 620 during flight.

After the payload 620 is inserted into the drone (FIG. 6B) and attached to the electrical harness or other components in the payload housing 642, the drone can be changed into flight mode. In flight mode, a user operates the rotors 612 and lifts the drone into flight. As the drone lifts from the ground, the payload 620 slides down along the track 672 through the passage 614 and is received into the mating interface in the chassis 640, as shown in FIG. 6A. In this position, the payload 620 will move with the chassis 640 and swivel 630. The user can navigate the drone 600 to a desired location and orient the payload into a desired direction below the drone.

In an embodiment, the payload housing 642 includes a payload camera 644 which is aligned with the barrel of the firearm 670 to assist the user in aiming the firearm 670. Additional imaging devices (scopes, night vision devices, and others) can be carried by the firearm 670 or the payload housing 642 and can be viewed by the drone operator in order to move the payload into the desired orientation. In an embodiment, the payload housing 642 also retains a magazine with additional projectile rounds for the firearm, and the motors or switches that engage with the trigger of the firearm to fire it. These components can be reused with different firearms that fit through the payload housing 642.

In an embodiment, the drone 600 includes a descent mode that is used when the drone is ready to land. When the drone enters descent mode, the drone orients the payload vertically down along the drone's vertical axis, in alignment with the central passage (as in FIG. 6A). The drone also puts the payload into an inoperable state, such as by disengaging the trigger motors from the firearm 670 and/or by engaging a safety mechanism that prevents the firearm from being triggered. In this configuration, the firearm cannot be operated during descent and landing. This descent mode can be used with other types of payloads too, such as fire retardant, liquid cargo, and other materials. During descent mode, the payload is disabled such that it will not dispense or release this cargo during descent and landing. Disabling the payload and orienting it vertically down can be done automatically by the drone upon entering descent mode.

Upon landing, the mating interface releases the payload 620 from the rotating frame, enabling the payload to translate upward through the central passage 614 and emerge above the top opening 616, as shown in FIG. 6B. The mating interface can include a mechanical lock, switch, or motor that holds the payload in place during flight, preventing it from moving vertically back up the central passage 614. When this motor or lock is released, the payload 620 is able to translate up through the central passage 614. In an embodiment, the ground pushes the payload up through the central passage when the drone lands. The drone may also have a backup pressure-based release that releases the mating interface upon pressure of the payload against the ground, in the event that the motor or lock was still engaged. As the drone comes into contact with the ground, the tip of the payload touches down first, and the payload is pushed up through the central passage until the legs 634 of the drone reach the ground. The drone is then resting stable in the position of FIG. 6B, where the drone can be serviced (such as maintenance or refueling) and the payload can be removed, refilled, and/or replaced.

Figure 6C:
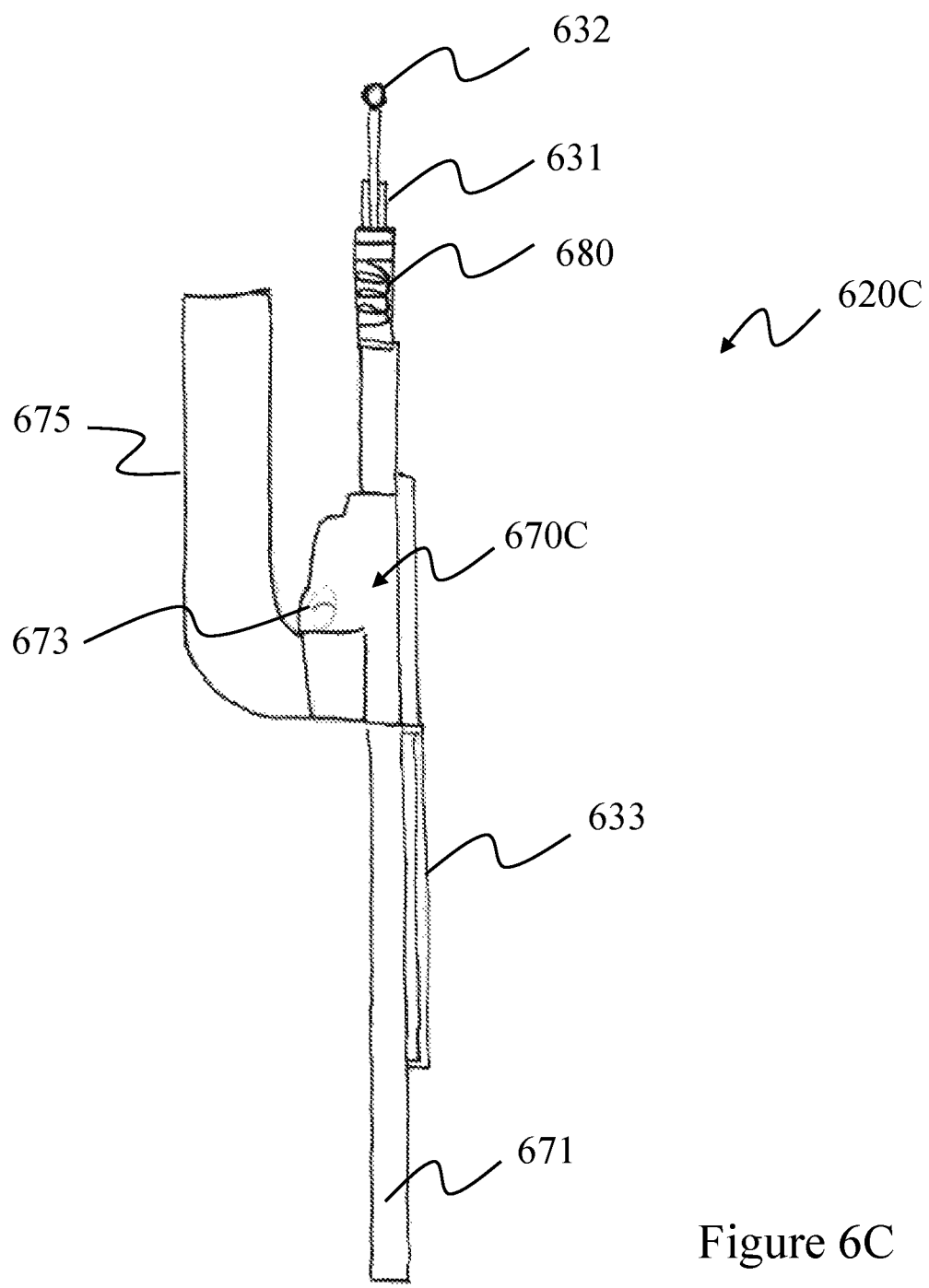
FIG. 6C shows a payload according to an embodiment of the present disclosure.

A payload with a shock absorber is shown in FIG. 6C. In this embodiment, the payload 620C includes a firearm 670C carried below the crossbar 632. The firearm has a barrel 671, trigger 673, and magazine 675. The payload also includes a shock absorber 680 that absorbs recoil from the firearm against the crossbar 632. The shock absorber 680 includes magnets, springs, gas, or other dampening mechanisms that cushion recoil from the firearm. When the firearm is fired, the recoil force moves the firearm against the shock absorber 680 in the direction of the crossbar 632, and the crossbar 632 pushes the weight of the payload against the rotating frame (such as pushing against a slot in the chassis or against vertical grooves in columns extending down from the swivel, as described above). The trigger 673 is operated by a switch or motor that is activated through the electrical harness that connects the firearm to the drone body (see also FIG. 9). A cushion 631, such as a foam material, below the crossbar 632 provides additional dampening to absorb motion of the firearm components along the firing direction and to safeguard these components from recoil impact against the crossbar 632. The firearm 670C may also include a gas channel 633 that uses gas pressure from combustion to automatically reload the chamber. In an embodiment, the crossbar 632 can also move, such as by sliding up and down (such as along groove 472 shown in FIG. 4B) when the firearm is fired, to reduce the recoil force against the chassis or swivel.

Figure 7A:
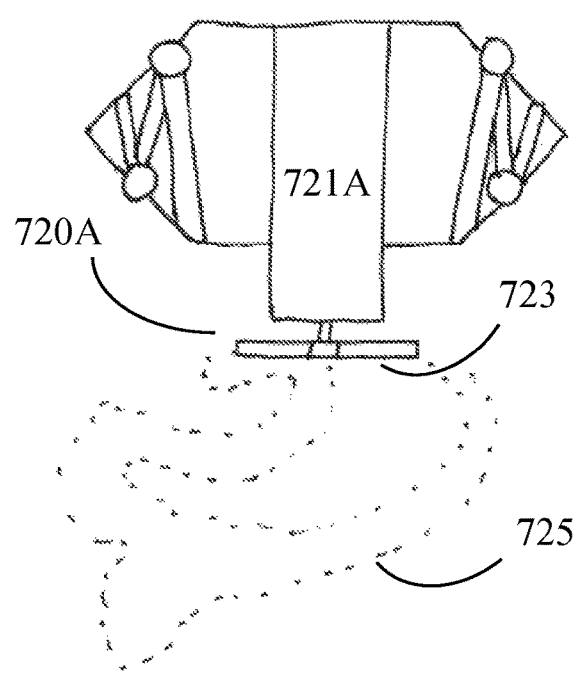
FIGS. 7A-C depict various payloads for an aerial drone according to embodiments of the present disclosure.
Figure 7B:
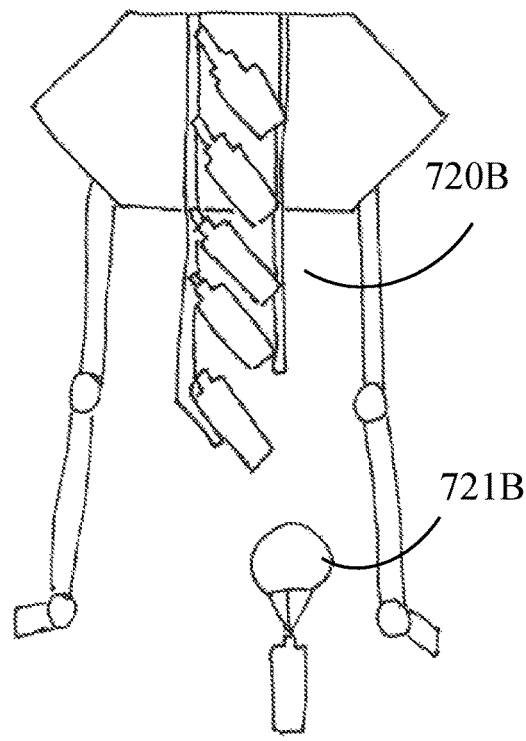
Figure 7C:
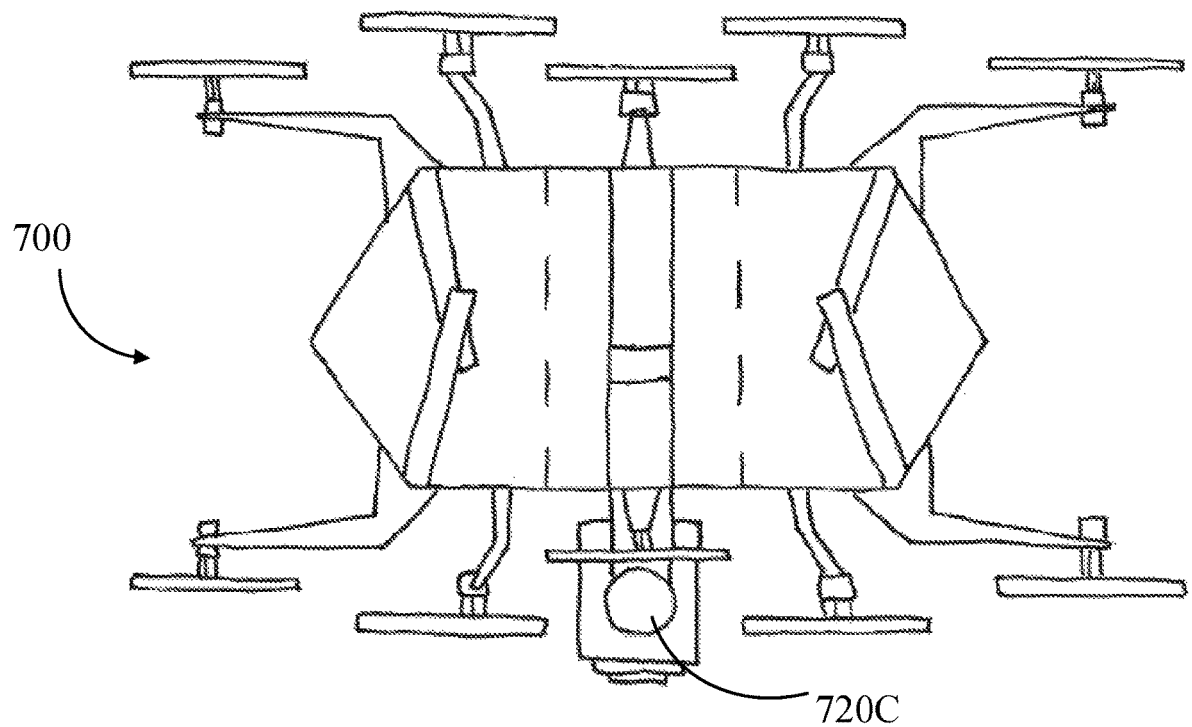

FIGS. 7A, 7B, and 7C show various payloads for an aerial drone according to embodiments of the present disclosure. In FIG. 7A, the payload 720A includes a tank 721A with seeds, water, or other cargo for dispensing over agricultural land. A spinning plate 723 extends below the drone body and spins to disperse the seeds 725 (or water or other substance). In FIG. 7B, the payload 720B includes a trapdoor opening that releases cargo 721B such as food packets, canisters, or other items to be dropped to a site. The cargo 721B are stacked inside the hollow central passage of the drone, and when the trap door opens they move down a linear path until they are released below the drone. Each cargo item can have an optional parachute that deploys as it falls.

FIG. 7C shows a mirrored or symmetric drone 700 with rotors on both the top and bottom and a camera payload 720C. This drone 700 can flip upside down and continue flying, by using the mirrored set of rotors on the bottom of the drone body. When the drone flips over, the camera payload drops down through the central passage to extend below the drone and continue taking images. The camera payload can move back and forth through the central passage, like a pendulum, as the drone flips over. This drone can be deployed in hazardous weather conditions, such as hurricanes, tornadoes, and dangerous storms, and can continue to navigate and gather image data even when strong winds or other weather events cause the drone to flip upside down. This versatility through difficult weather conditions is enabled by the donut design, which allows the camera payload to slide back and forth to the top or bottom of the drone as it flips over. Additionally, in this embodiment, the legs fully retract into the drone body to avoid interfering with the camera or sustaining damage from exposure to the weather.

The aerial drones shown herein can be used for various other applications as well, such as mapping, package delivery, aid drops, audible announcements, loitering, sporting events, training, hunting, and other uses. Other payloads could include liquid cargo, gas cargo, seeds, cameras, supply cargo, weapons, sensors, cameras, and instrumentations for various applications.

As demonstrated in this disclosure, the donut-shaped design with a central passage passing through the drone body provides many benefits in drone operation. The payload translates up through the central passage on landing, collapsing the form factor of the drone into a smaller footprint to save space. The design is also symmetric and omni-directional during use, enabling the payload to be pointed in any direction in the hemispherical space below the drone body. The drone can handle recoil or other forces from the payload in any direction, and can handle these forces regardless of the flight orientation of the drone body itself. That is, the drone body does not have to move into a particular orientation in order to prepare to handle recoil forces from the payload. The donut design also enables the drone to point the payload directly down at the ground. For military embodiments in which the payload is a firearm, this enables the drone to approach targets from directly overhead at high altitudes, rather than obliquely from a lower altitude. Operating at higher altitudes can be safer for the drone.

Another benefit of the donut design is that the drone body does not have to rotate in order to aim the payload. The payload can be rotated and aimed below the drone without requiring the drone body to rotate as well. The flight orientation (of the drone body) and aiming orientation (of the payload) are independent. The donut design is also modular, accommodating payloads of different sizes, lengths, and shapes. These different payloads can include a mating interface (such as the crossbar) that engages with the drone so that the drone can carry any of them. The donut design also provides a safety benefit during takeoff and landing, as the payload can be pointed directly down and can be automatically sheathed upon landing.

Figure 8:
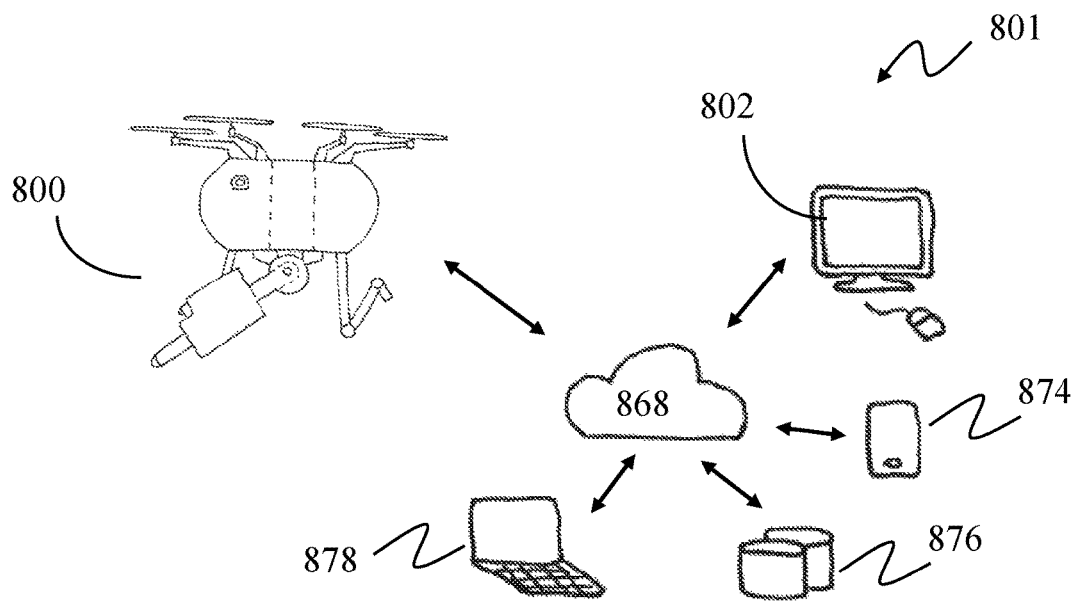
FIG. 8 is a system view of an aerial drone within a network, according to an embodiment of the present disclosure.

A system 801 for operating an aerial drone 800 according to an embodiment is shown in FIG. 8. The system 801 includes wireless communication between the drone 800 and remote devices through a network 868. The network 868 may be a cloud-based network, local network, satellite network, radio communications, or other configuration of connected devices. The network 868 connects wirelessly to devices such as a display screen 802 (with associated computer with user inputs such as a mouse or keyboard), handheld device 874 (such as a smartphone, tablet, or portable console), database 876, laptop computer 878, and other distributed devices. One or more users can use these devices to operate the drone 800 or view images or other data from the drone.

Figure 9:
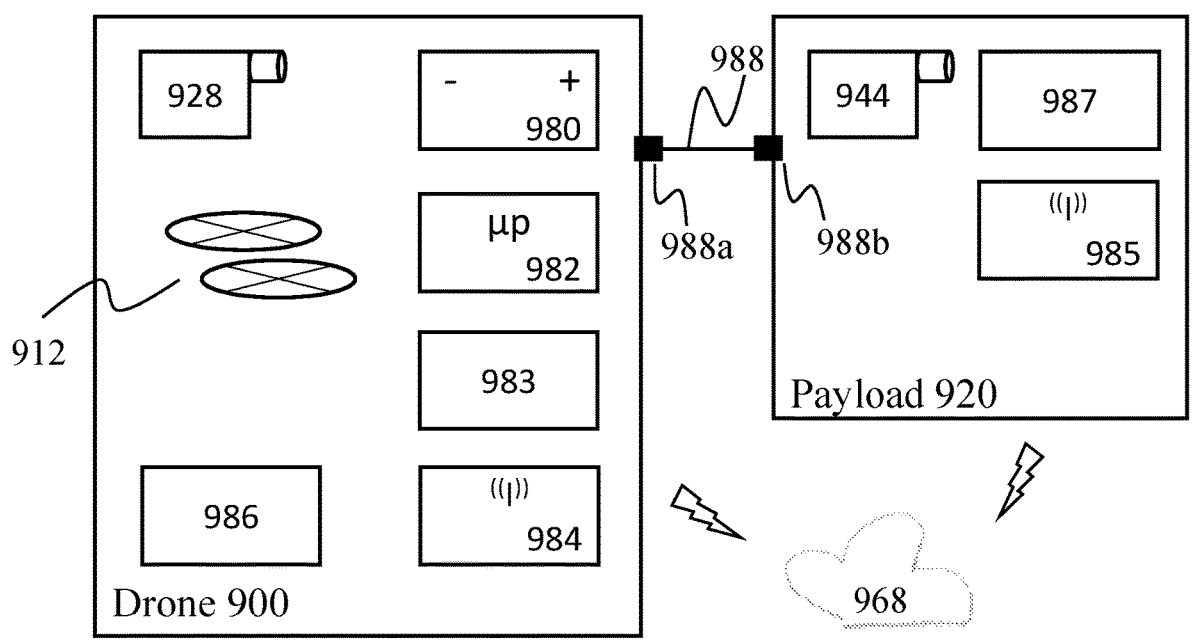
FIG. 9 is a schematic diagram of an aerial drone with a payload, according to an embodiment of the present disclosure.

A block diagram view is shown in FIG. 9, according to an embodiment. The drone 900 includes a flight camera 928, power supply 980 (such as one or more onboard batteries and/or solar panels), a microprocessor 982 programmed to operate the drone (including in flight mode, descent mode, and other modes), hardware memory 983, rotors 912, a wireless transceiver 984, and swivel and chassis motors 986. Additional components may be included in the drone 900 as well, such as gears coupled to the rotating frames, servo motors and switches, electrical cables, multiple processors, position sensors (such as a GPS sensor), accelerometers, gyroscopes, orientation sensors, and microphones. The microprocessor 982 executes software instructions for flight operations including rotor speed control, rotor pitch control, speed control, directional control, descent mode, and other operations for controlling the drone.

The drone 900 is connected to a payload 920 with a wiring harness 988. The wiring harness 988 is releasable from the drone 900 at connector 988*a* and from the payload 920 at the connector 988*b*. The payload 920 includes a payload camera 944, wireless transceiver 985, and environmental sensors 987. The drone 900 and payload 920 communicate with each other through the harness 988, and also communicate to each other and to other distributed devices through the wireless network 968.

Figure 10:
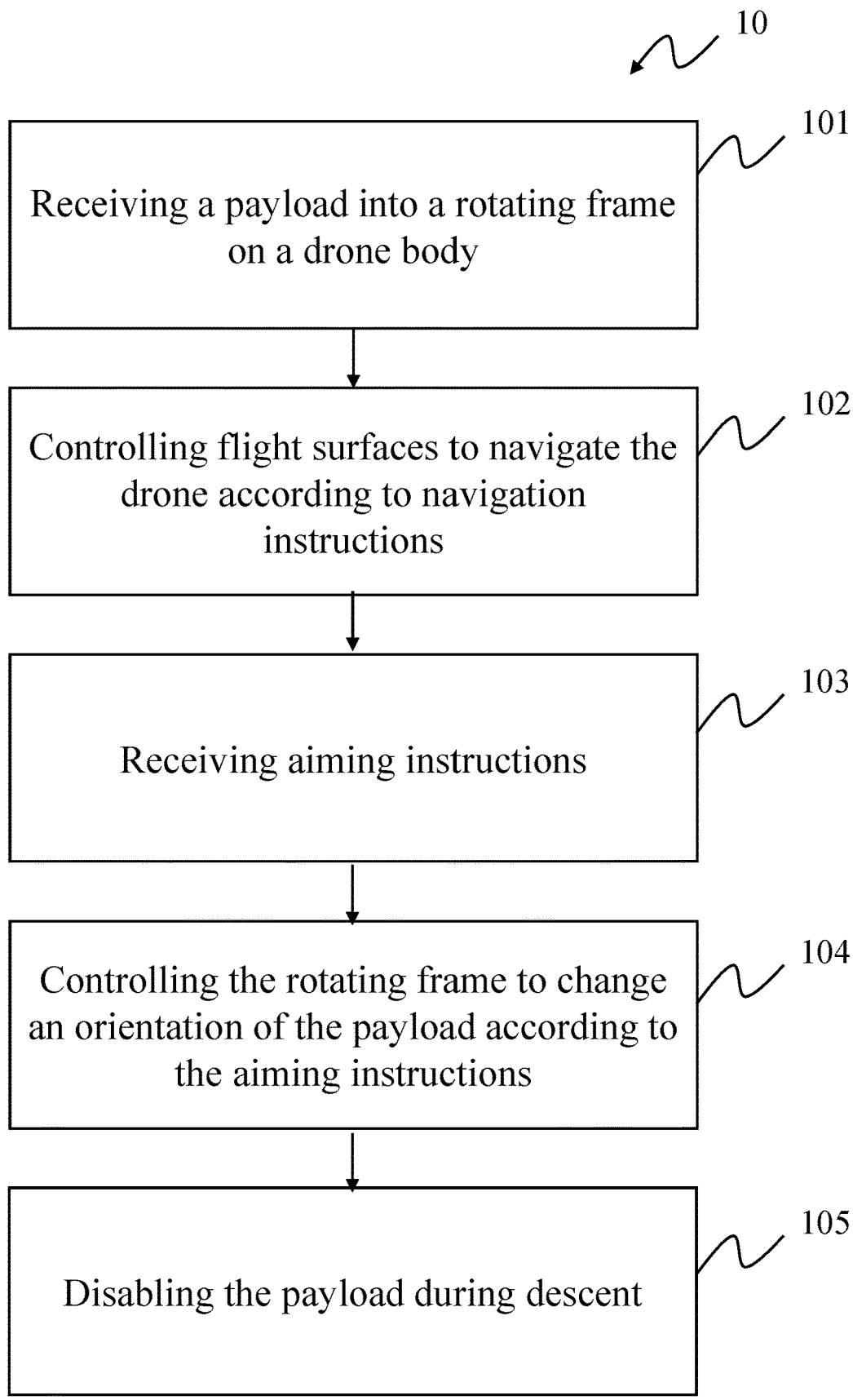
FIG. 10 is a flowchart of a method of operating an aerial drone, according to an embodiment of the present invention.

A method of operating an aerial drone is shown in FIG. 10, according to an embodiment of the present invention. The method 10 includes receiving a payload into a rotating frame on a drone body 101, such as by receiving the payload through a central passage in the drone body into a mating interface with the rotating frame (such as a swivel or chassis). The method also includes controlling flight surfaces (such as rotors) on the drone to navigate the drone according to navigation instructions 102. Navigation instructions can be automated or received in real-time from a remote user interface. The method also includes receiving aiming instructions at 103, and controlling the rotating frame, based on the aiming instructions, to change an orientation of the payload 104. The method also includes disabling the payload during descent 105. When disabled, the payload cannot be activated, meaning that it will not release cargo, fire a weapon, or deploy other materials on board. This non-operational state may be a landing mode in which the payload is oriented directly down (aligned with the central passage) and a safety mechanism is engaged or the payload is disabled.

Figure 11:
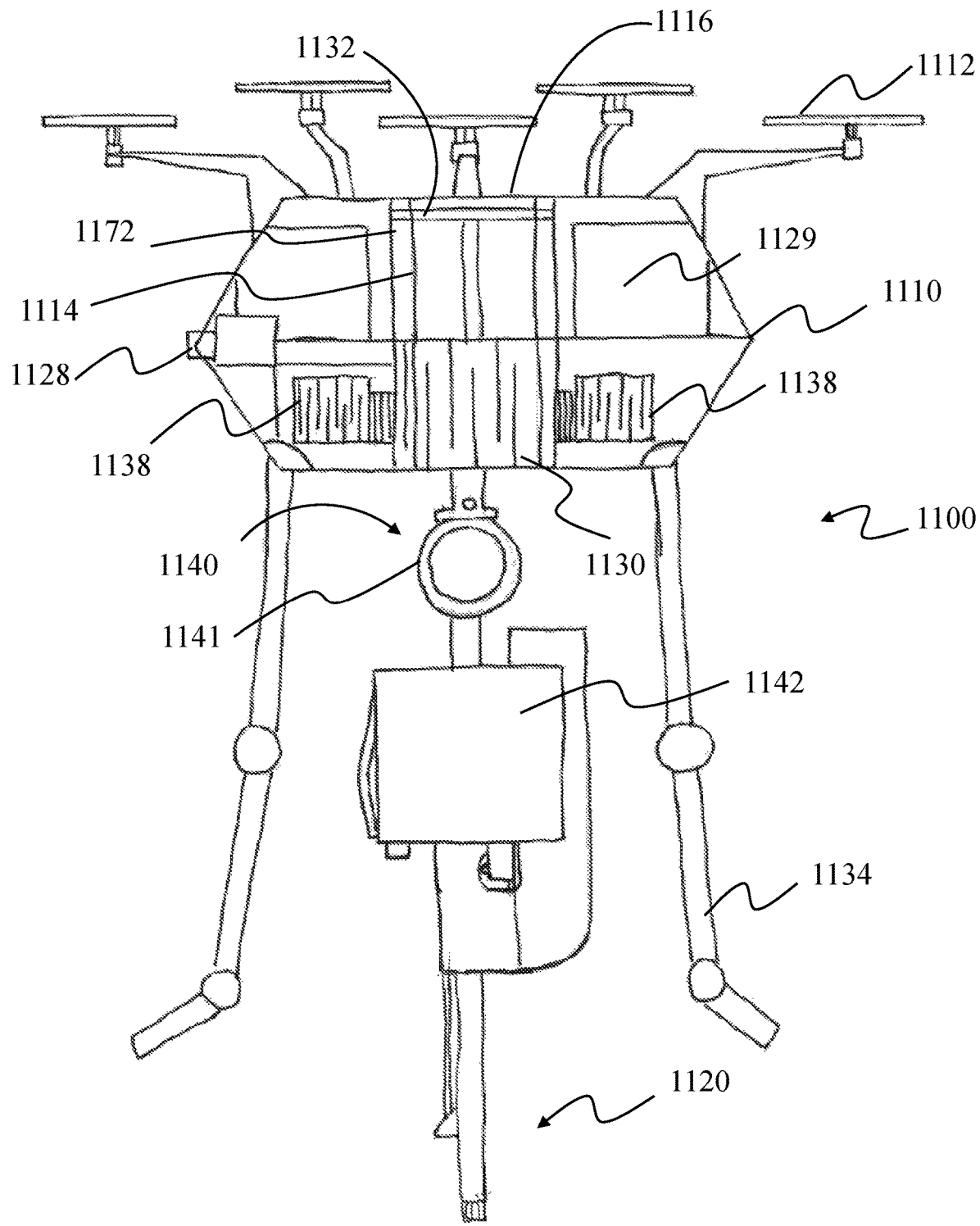
FIG. 11 is a cross-sectional view of an aerial drone according to an embodiment of the present disclosure.

FIG. 11 shows a cross-sectional view of an aerial drone 1100, according to an embodiment. The drone 1100 includes a drone body 1110, rotors 1112, swivel 1130, chassis 1140, payload 1120, payload housing 1142, central passage 1114 with top opening 1116, crossbar 1132 (shown before sliding down into the deployed position), and articulating legs 1134. In cross-section, a few other components inside the drone body are shown, including the vertical track 1172, and gears 1138. The gears 1138 are turned by motors and are engaged with the swivel 1130 to rotate the swivel 1130. The drone body also includes one or more on-board batteries 1129 and flight camera 1128. The drone 1100 includes a cap or seal, such as a rubber disc, that covers the top opening 1116 when the payload is dropped down into the deployed position. The seal protects the central passage from exposure to wind, rain, and other environmental factors, and includes slits that allow the seal to flex open for the payload to pass through the seal when in the landed position. Other components may also be included within the drone body 1110, such as the components described in the block diagram of FIG. 9. In an embodiment, rotation of the payload in two different planes is accomplished by the gears 1138, which rotate an upper portion of the frame about the first vertical axis, and a sprocket system 1141 that rotates a lower portion of the frame about the second horizontal axis.

As described above, the rotating frame enables the drone to orient the payload in a desired direction below the drone body. In an embodiment, the rotating frame includes a swivel that rotates within at least 360 degrees of rotation about a vertical axis, and a chassis that rotates the payload within 180 degrees about a horizontal axis. In some embodiments, the chassis may not have a full 180 degrees of rotation, and instead may rotate within at least 120, 130, 140, 150, 160, 170 degrees. This amount of rotation provides almost 180 degrees but does not quite lift the payload up to horizontal with the drone. In other embodiments, the swivel may rotate a small amount past 180 degrees, such as 190 or 200 degrees. When the chassis rotates through less than 180 degrees and/or the swivel through more than 180 degrees, the three-dimensional space in which the payload can be oriented is not exactly a full hemisphere, but can still be approximated as a hemisphere or hemispherical space.

Method and software steps described herein can be implemented at least in part using one or more computer systems, circuits, or similar devices, such as one or more processors coupled to one or more tangible memory storage devices (such as magnetic storage devices, optical storage devices, solid state devices, programmable memory, and other storage). The memory device stores software code, program instructions, or other computer readable instructions executed by the computer system processors.

It should be noted that components in the figures are not necessarily to scale. Although exemplary embodiments have been described and illustrated, it should be understood that changes and modifications to these exemplary embodiments are also within the intended scope of this disclosure.

What is claimed is:

1. An aerial drone comprising:
   a drone body;
   a rotating frame coupled to the drone body at a bottom of the drone body and rotatable with respect to the drone body around a first axis;
   a central passage passing through the drone body and through the rotating frame along the first axis, the central passage extending between a top opening in the drone body and a bottom opening in the rotating frame;
   a payload translatable within the central passage between a stowed position on a ground surface in which the payload is disabled and emerges above the top opening and a deployed position in flight in which the payload is enabled and is mated to the rotating frame and emerges below the bottom opening, and
   a mating interface that vertically receives the payload into the rotating frame in the deployed position, and further comprising a locking mechanism that secures the payload to the rotating frame;
   wherein the payload is rotatable by the rotating frame in the deployed position,
   wherein the payload is translatable, by contact with the ground surface, from the deployed position up through the central passage in the rotating frame and the drone body into the stowed position to collapse the drone into a reduced form factor upon landing.

2. The aerial drone of claim 1, wherein the payload comprises a fire retardant.

3. The aerial drone of claim 1, wherein the rotating frame comprises a swivel rotatable through at least 360 degrees about the first axis.

4. The aerial drone of claim 1, wherein the mating interface comprises a vertical slot or groove receiving a crossbar in the payload.

5. The aerial drone of claim 1, wherein the rotating frame comprises a swivel and a chassis coupled to the swivel, and wherein the swivel is rotatable through at least 360 degrees about the first axis, and wherein the chassis is rotatable with respect to the swivel about a second axis.

6. The aerial drone of claim 5, wherein the first axis is vertical with respect to the drone body and the second axis is horizontal with respect to the drone body.

7. The aerial drone of claim 6, wherein the mating interface secures the payload to the chassis.

8. The aerial drone of claim 6, wherein the payload comprises a firearm.

9. The aerial drone of claim 8, wherein the payload further comprises a shock absorber acting between the firearm and the rotating frame.

10. The aerial drone of claim 1, wherein the drone body further comprises a plurality of articulating legs, and wherein, in the deployed position, the payload extends below the legs.

11. The aerial drone of claim 1, wherein the central passage has a diameter of 8-12 inches.

12. The aerial drone of claim 1, further comprising a detachable electrical harness electrically coupling the payload to the drone body.

13. The aerial drone of claim 1, wherein, in the stowed position, the payload is removable from the drone body through the top opening and replaceable with a second different payload.

14. An aerial drone comprising:
    a drone body comprising a flight camera and a plurality of flight surfaces;
    a swivel coupled to the drone body and rotatable with respect to the drone body around a first vertical axis;
    a central passage through the drone body and through the swivel along the first vertical axis, the central passage extending between a top opening in the drone body and a bottom opening in the swivel;
    a chassis supported by the swivel and positioned below the bottom opening, wherein the chassis is rotatable with respect to the swivel around a second horizontal axis;
    a payload translatable within the central passage between a stowed position in which the payload is disabled and emerges above the top opening and a deployed position in which the payload is enabled and emerges below the bottom opening,
    a mating interface between the payload and the chassis comprising a locking mechanism that secures the payload to the chassis in the deployed position; and
    wherein the drone body comprises a controller programmed to execute a descent mode in which the chassis is rotated to point the payload at a ground surface, the payload is disabled, and the mating interface vertically releases the payload from the chassis upon contact with the ground surface, and
    wherein the payload is translatable, by contact with the ground surface, from the deployed position up through the central passage into the stowed position to collapse the drone into a reduced form factor upon landing.

15. The aerial drone of claim 14, wherein the controller is further programmed to disable the payload during descent mode.

16. The aerial drone of claim 14, wherein the controller is further programmed to execute a flight mode and wherein, in the flight mode, the payload is operable within a hemispherical space defined by rotation of the swivel through at least 360 degrees and rotation of the chassis through at least 140 degrees.

17. The aerial drone of claim 14, further comprising a payload housing supported by the chassis, the payload housing comprising a payload camera.

18. A collapsible aerial drone comprising:
a drone body with a plurality of rotors;
a rotating frame coupled to the drone body at a bottom of the drone body and rotatable with respect to the drone body around a first vertical axis;
a central passage passing through the drone body and through the rotating frame along the first vertical axis, the central passage extending between a top opening in the drone body and a bottom opening in the rotating frame;
a vertical track along an inside surface of the central passage;
a payload sized to fit through the central opening and comprising a crossbar that slides within the vertical track;
a mating interface that vertically receives the crossbar into the rotating frame to secure the payload to the rotating frame in a deployed position, wherein the payload emerges below the bottom opening in the deployed position;
a locking mechanism that secures the crossbar to the mating interface in the deployed position; and
a controller in the drone body programmed to execute a descent mode in which the locking mechanism releases the crossbar from the mating interface and the drone automatically collapses into a reduced form factor upon contact with a ground surface.

19. The collapsible aerial drone of claim 18, wherein the controller is further programmed to disable the payload in the descent mode.

* * * * *